United States Patent
Chopra et al.

(10) Patent No.: US 7,904,559 B2
(45) Date of Patent: Mar. 8, 2011

(54) HTTP-BASED PUBLISH-SUBSCRIBE SERVICE

(75) Inventors: Amit K. Chopra, Raleigh, NC (US); Brett G. King, Cary, NC (US); Brandon J. W. Smith, Cary, NC (US); Aaron J. Tarter, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 11/875,401

(22) Filed: Oct. 19, 2007

(65) Prior Publication Data
US 2009/0106252 A1 Apr. 23, 2009

(51) Int. Cl.
*G06F 15/173* (2006.01)
*G06F 15/16* (2006.01)

(52) U.S. Cl. .......................... 709/226; 709/219

(58) Field of Classification Search .................. 709/226
See application file for complete search history.

(56) References Cited

U.S. PATENT DOCUMENTS

| | | | |
|---|---|---|---|
| 5,956,490 A * | 9/1999 | Buchholz et al. | 709/245 |
| 2002/0055956 A1* | 5/2002 | Krasnoiarov et al. | 707/513 |
| 2002/0065912 A1* | 5/2002 | Catchpole et al. | 709/224 |
| 2006/0167860 A1* | 7/2006 | Eliashberg et al. | 707/3 |
| 2007/0143502 A1* | 6/2007 | Garcia-Martin et al. | 709/246 |
| 2007/0214097 A1* | 9/2007 | Parsons et al. | 706/12 |
| 2007/0226312 A1* | 9/2007 | Stirbu et al. | 709/217 |
| 2008/0096664 A1* | 4/2008 | Baray et al. | 463/42 |
| 2008/0320443 A1* | 12/2008 | Da Palma et al. | 717/110 |

* cited by examiner

*Primary Examiner* — Aaron Strange
*Assistant Examiner* — James Edwards
(74) *Attorney, Agent, or Firm* — Steven L. Nichols; Van Cott, Bagley, Cornwall & McCarthy P.C.

(57) ABSTRACT

Resources are retrieved asynchronous through the use of resource requests to a feed server. When the feed server returns an initial requested resource, a URI for a next resource is sent to the requesting subscriber. The URI for the next resource was pre-generated by the feed server before the next resource was created, thus allowing the subscriber to have a pending asynchronous resource request at the feed server. This resource request persists on the feed server until the new resource becomes available.

20 Claims, 3 Drawing Sheets

HTTP-BASED PUBLISH-SUBSCRIBE SERVICE

BACKGROUND OF THE INVENTION

The present disclosure relates to the field of computers, and specifically to software. Still more specifically, the present disclosure relates to acquiring resources through the use of resource request commands.

BRIEF SUMMARY OF THE INVENTION

A method for asynchronously retrieving resources through the use of resource requests to a feed server is presented. When the feed server returns an initial requested resource, a URI for a next resource is sent to the requesting subscriber. The URI for the next resource was pre-generated by the feed server before the next resource was created, thus allowing the subscriber to have a pending asynchronous resource request at the feed server. This resource request persists on the feed server until the new resource becomes available.

DETAILED DESCRIPTION OF THE INVENTION

Figure 1:
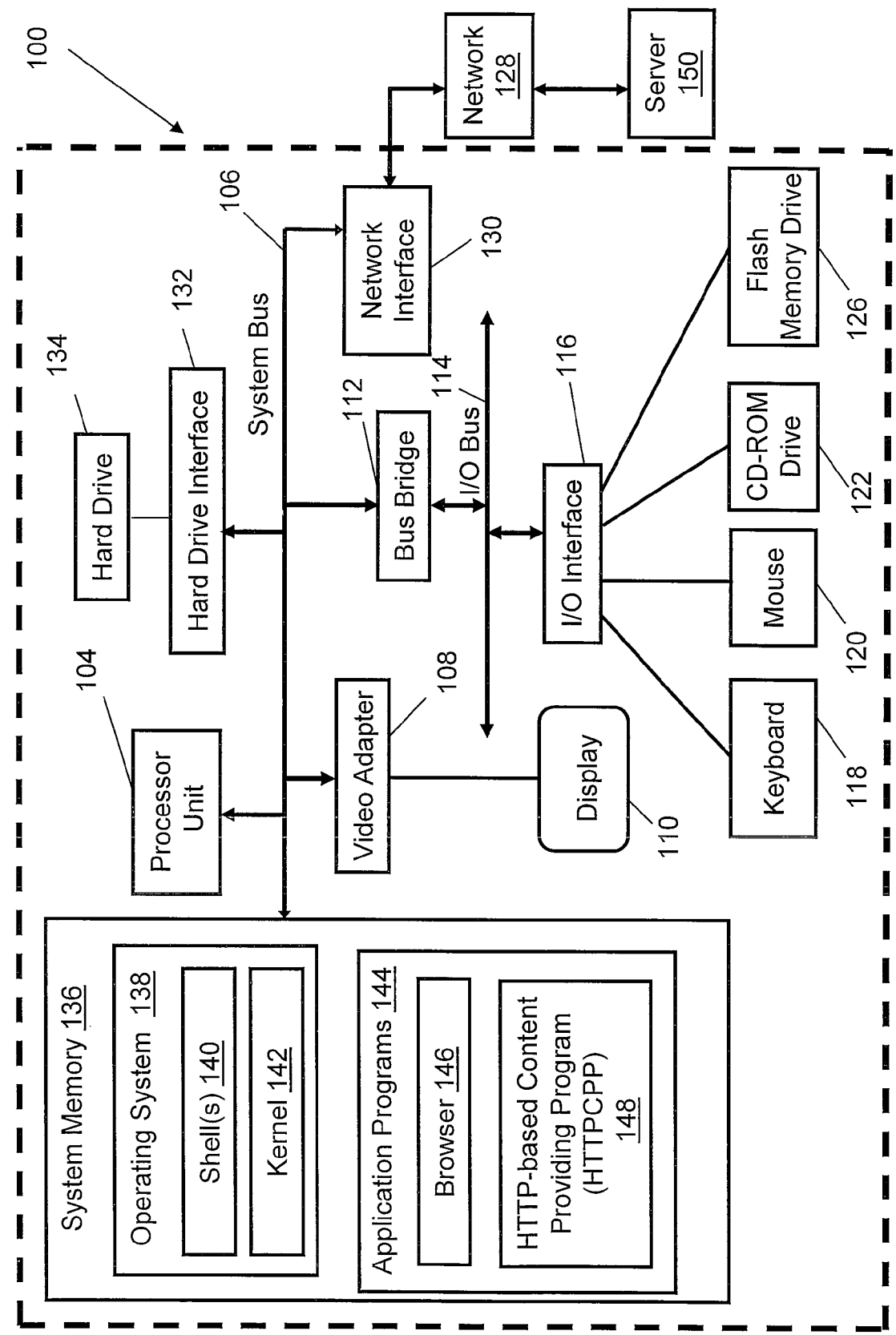
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include an HTTP-based Content Providing Program (HTTPCPP) 148. HTTPCPP 148 performs the functions described below in FIGS. 2-3.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
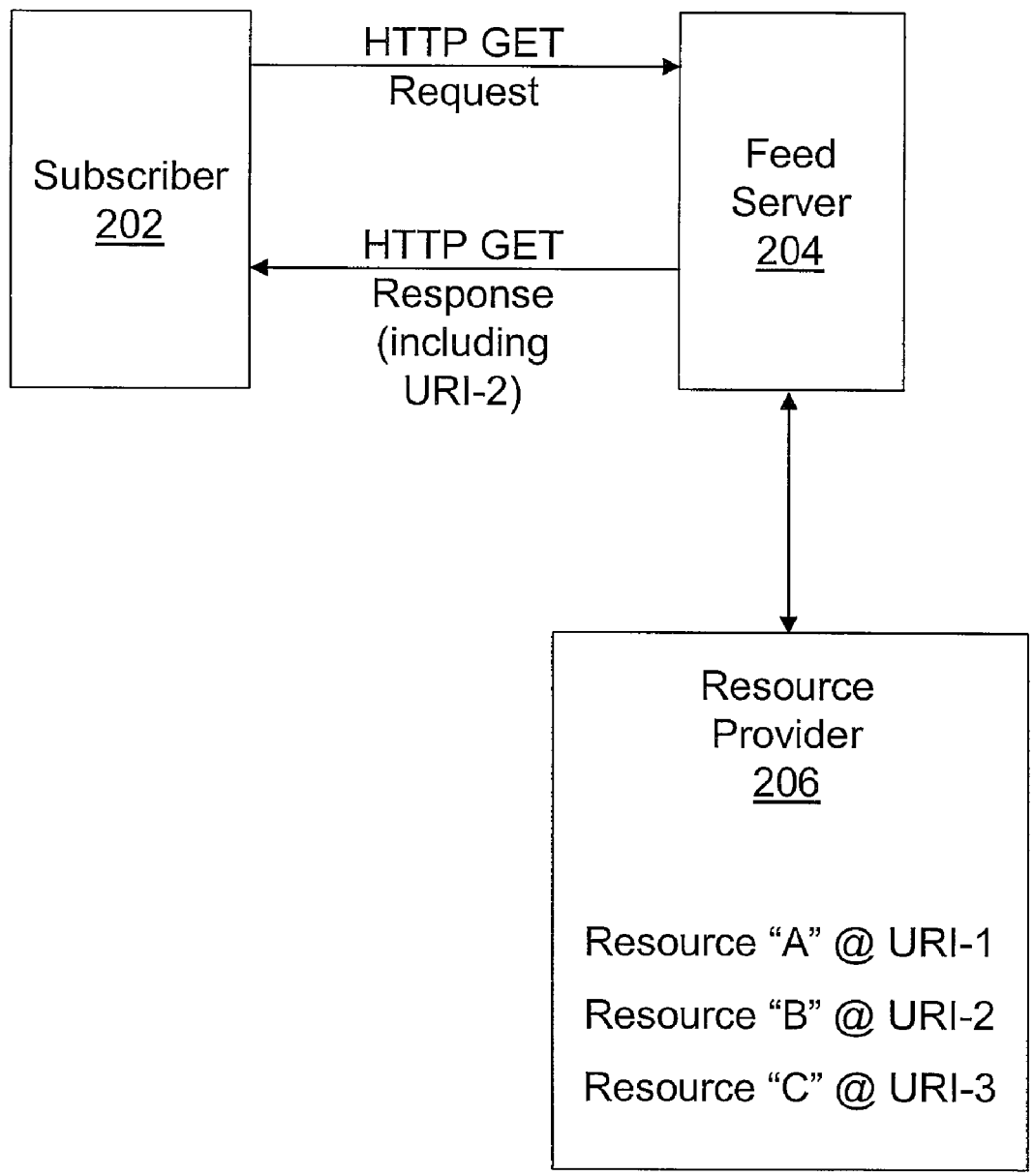
FIG. 2 illustrates an environment of a feed server.

With reference now to FIG. 2, an environment in which the present invention may operate includes a subscriber 202, a feed server 204, and a resource provider 206, each of which may utilize a computer architecture such as that described for computer 100 shown above in FIG. 1. Subscriber 202 sends a request for a resource via a HyperText Transfer Protocol (HTTP) GET request. The HTTP GET request will request a specified resource. Initially, the feed server 204 will have a persistent list of resources that are available to the subscriber 202, such that the feed server 204 has a feed server-defined entry point for the subscriber to request a resource. The feed server 204 processes that HTTP GET request to retrieve a requested resource from a feed that is made up of multiple resources provided by resource provider 206.

For example, assume that subscriber 202 requested Resource "A", which is located at URI-1, which is the Universal Resource Identifier (URI) location at which the Resource "A" can be found. The feed server 204 returns the Resource "A" along with URI-2, which identifies where the next resource for the feed series will be found. Note that URI-2 is assigned by feed server 204, and that there is no requirement for URI-2 to point to any actual content when URI-2 is created by feed server 204. That is, feed server 204 includes logic for creating a next URI for a next resource in a feed series, even before that next resource actually exists and/or is available. When the next content is created, feed server 204 then assigns URI-2 to that next content. The subscriber 202 is able to send another HTTP GET request for the content at URI-2 at any time to the feed server 204. Note that the feed server 204 will not process the HTTP GET request for the content at URI-2 until Resource "B" is available.

In one embodiment, the feed server 204 consumes content from the resource provider 206 and publishes the content through an HTTP interface using Representational State Transfer (REST) principles. REST principles include publishing content as resources at known URIs and using HTTP without any additional messaging layer (such as SOAP) or state tracking (such as through HTTP cookies). In one embodiment, the feed server 204 also uses the Atom Publishing Protocol (APP), which is an XML formal used to describe how a feed of resources is published and updated. Thus, as described herein, APP is used as an HTTP interface to acquire resources requested by subscriber 202 from the resource provider 206.

Figure 3:
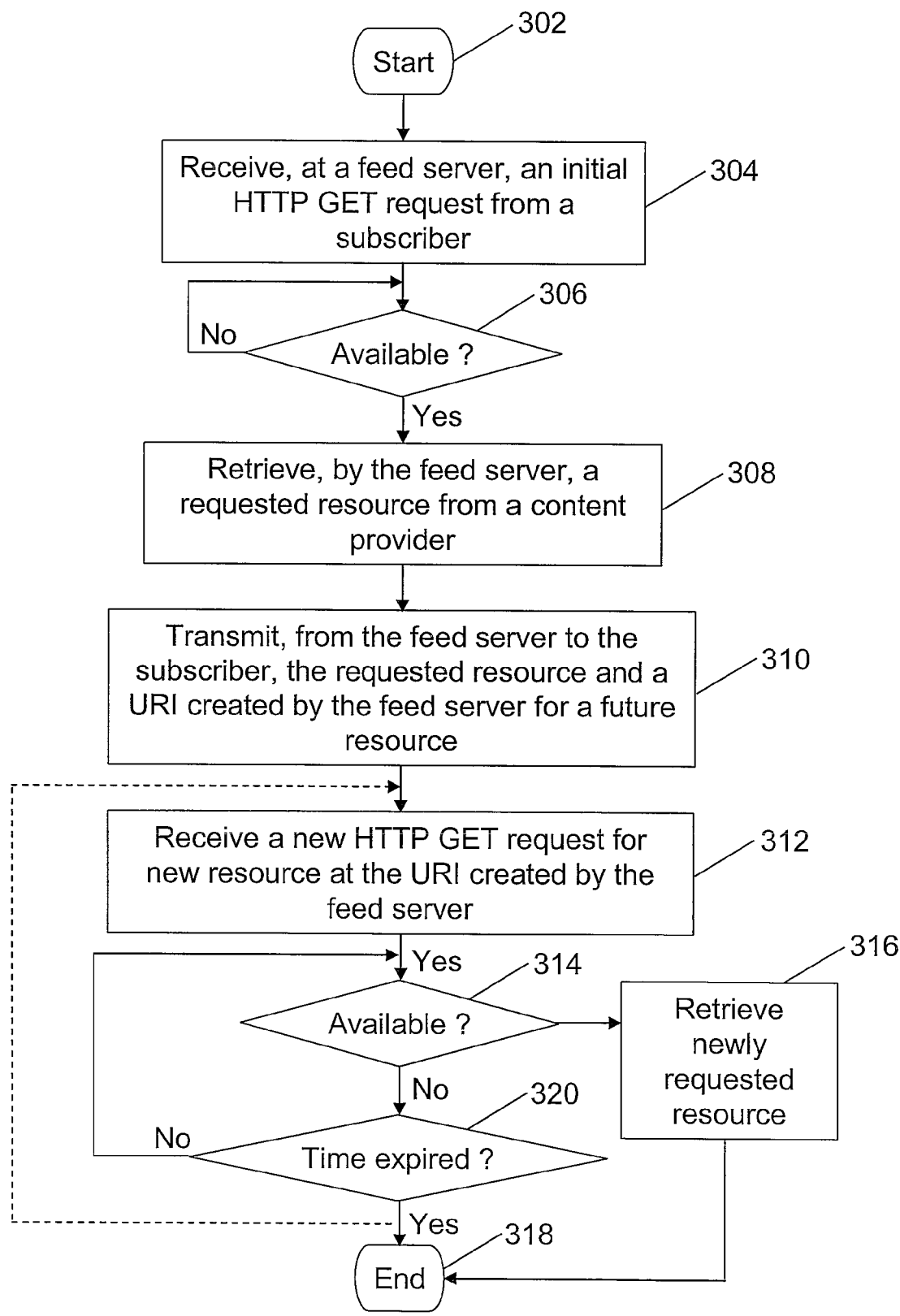
FIG. 3 is a high-level flow-chart of exemplary steps taken to utilize the feed server to asynchronously retrieve a resource from a resource provider.

Referring now to FIG. 3, a flow-chart of exemplary steps taken to retrieve resources using an HTTP-based feed server is presented. After initiator block 302, which may be prompted by a subscriber requesting a resource from a resource provider, an HTTP GET request is received at the HTTP-based feed server (block 304). The resource may be any resource that is identified by a URI. Exemplary resources include, but are not limited to, web pages, portals, portlets, servlets, and any server-side service. Assume for illustration purposes that the resources are webpages of news items provided by a news service. If the initially requested news webpage is available (query block 306), then the feed server retrieves that news item (block 308). The retrieved news webpage, along with the URI for the next URI in the feed, is then transmitted to the subscriber (block 310). Note again that the next URI is created and managed by the feed server.

Assume that the first news item is "A", and the next news item (when it later becomes available) will be "B", and the following news item will be "C." In this example, pseudocode for the HTTP GET response (which includes the URI's for future subsequent webpages) is:

```
<feed xmlns="http://www.w3.org/2005/Atom">
 <link rel="first"
  href="http://example.org/entries/EventSource" />
 <link rel="next"
  href="http://example.org/entries/B" />
 <link rel="last"
  href="http://example.org/entries/last" />
 <entry xmlns="http://www.w3.org/2005/Atom">
  <title>Event A</title>
  <id>urn:uuid:1225c695-cfb8-4ebb-aaaa-80da344efa6a</id>
```

-continued

```
<updated>2005-10-07T17:17:08Z</updated>
<author><name>Event Source</name></author>
<content>Content of Event A</content>
</entry>
</feed>
```

(Note that the URI's (e.g., "http://***") shown in the pseudocode above, as well as URI's discussed below, are exemplary URI's used for illustration only, and are not intended to represent actual hyperlinks.)

In the exemplary pseudocode shown, the HTTP GET response includes a "next" link to get event B (news webpage B). Note also that the resource addressed by the "next" URI may or may not exist when the server returns it in the HTTP GET response.

Returning now to FIG. 3, the subscriber can then use the new URI (http://example.org.entries/B) to request (using a new HTTP GET request) that the feed server supply the next webpage when it becomes available (block 312). Thus, when the next webpage does in fact become available (query block 314), the new webpage is sent to the subscriber (block 316), and the process ends (terminator block 318). If the new webpage is not available within a prescribed length of time (query block 320), then the new webpage is not sent to the subscriber. The process may end (terminator block 318), or another HTTP GET request for a new resource may be initiated by the client, as indicated by the dashed line back above block 312.

The steps and pseudocode above describe the case where the page size is equal to one. With an increased page size, multiple events can be received per request. Note that in order to provide a truly reliable mechanism, the feed server (using APP and REST) has to determine the location (TRI) of the "next" event prior to its existence, so that the client can know the next link to request and can be ensured that no events are lost and all events are processed in order. Thus, APP enables a "next" pointer, and REST allows the URI to point to an addressable entity, which is the next event. The feed server generates the next resource from content produced by the resource provider, and then publishes the resource at the "next resource URI," such as using APP.

Additional descriptions of the functionality of the method and system disclosed herein now follow. Assume that a resource is addressable by URI "X" and, when dereferenced, contains a representation of the event consumable by a client.

Long Polling

In order to enable reliable messaging using the feed architecture described above, the server (i.e., feed server 204) contracts with the client (i.e., subscriber 202) to provide a URI for the next page. At the end of the feed, events at X may not exist the instant a client makes the HTTP GET request. In this case, the server blocks the response until the next event occurs, and the server then responds with the representation of the event addressable at URI X. Thus, polling is avoided. To handle a large number of concurrent clients, efficient thread-pooling mechanisms, such as channels or low-level event architectures, may be used.

Reliable Delivery of Events

The method described herein also provides for a reliable delivery of events (e.g., resources) over HTTP. The client is essentially traversing a linked list, and therefore it always knows its location in the event stream; that is, the client (subscriber 202) knows the server (feed server 204) provided a next URI of the next event in this stream. A client's request could return an HTTP status code 404 ("not found") in case the HTTP connection times out. This could be because no event was made available at the advertised URI before the connection timed out. In such cases, the client issues as HTTP GET on that URI again, and again until it receives the event created at that URI.

Stateless Servers

Note that since the client is maintaining its location in the stream, the server itself is stateless. The server knows nothing of clients across individual requests, thus maintaining a key RESTful principle.

Flexibility for Clients

A client may use the paging feature in some feed formats (e.g., Atom) to efficiently start processing anywhere in the published event stream.

Note that the present invention does not use Comet style approaches. Comet uses streaming HTTP, which is a long lived HTTP connection with special JavaScript® (such as Asynchronous JavaScript and XML—AJAX). (JavaScript® is a trademark or registered trademark of Sun Microsystems, Inc. in the United States and other countries.) Comet simply uses a refreshing mechanism that is not suitable for building a reliable publish/subscribe system because there are no markers, or URIs, to address events in the stream or collection of events. If a client goes down, then there is no way that the client can ask the server to start from a particular event in the stream. Also, Comet is focused on client-to-server communications, whereas the present invention is more suited for reliable server-to-server communications.

Note also that the present invention also does not utilize standard HTTPR, which extends the HTTP application layer, but requires coordination across network intermediaries and ultimately defers to WS-Reliable Messaging, which, unlike the present invention, requires messaging and SOAP stacks.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for retrieving feed resources from a resource provider, the method comprising: receiving, at a feed server, an initial resource request from a subscriber, wherein the initial resource request requests an initial resource from a feed, and wherein the initial resource is located at an initial Uniform Resource Identifier (URI); retrieving, by the feed server, the initial resource requested by the initial resource request; transmitting, from the feed server to the subscriber, the initial resource and a next URI for a next resource in the feed, wherein the next URI is generated by the feed server for the next resource in the feed, and wherein the next URI is generated before the next resource in the feed is created; receiving, at the feed server, a next resource request from the subscriber, wherein the next resource request requests the next resource using the next URI that was transmitted from the feed server to the subscriber; in response to the next resource being created, assigning the next URI to the next resource, wherein the next URI is assigned to the next resource by the feed server; retrieving, by the feed server, the next resource using the next URI; and transmitting the next resource to the subscriber.

2. The method of claim 1, wherein the initial resource request is an initial Hypertext Transfer Protocol (HTTP) GET request, and wherein the next resource request is a next HTTP GET request.

3. The method of claim 2, wherein the next HTTP GET request remains on the feed server until the next resource is created.

4. The method of claim 1, wherein the feed server generates the next resource from content produced by the resource provider, and wherein the feed server subsequently publishes the resource located at the next URI through a use of Atom Publishing Protocol (APP).

5. The method of claim 1, wherein the next resource is a news webpage in a feed of news webpages.

6. The method of claim 1, wherein the next resource is a server-side service.

7. A system comprising:
a processor;
a data bus coupled to the processor; and
a memory coupled to the data bus;
in which said processor is configured to retrieve resources from a resource provider by performing the steps of: receiving, at a feed server, an initial HTTP GET request from a subscriber, wherein the initial HTTP GET request requests an initial resource from a feed, and wherein the initial resource is located at an initial Uniform Resource Identifier (URI); retrieving, by the feed server, the initial resource requested by the initial HTTP GET request; transmitting, from the feed server to the subscriber, the initial resource and a next URI for a next resource in the feed, wherein the next URI is generated by the feed server for the next resource in the feed, and wherein the next URI is generated before the next resource in the feed is created; receiving, at the feed server, a next HTTP GET request from the subscriber, wherein the next HTTP GET request requests the next resource using the next URI that was transmitted from the feed server to the subscriber; in response to the next resource being created, assigning the next URI to the next resource, wherein the next URI is assigned to the next resource by the feed server; retrieving, by the feed server, the next resource using the next URI; and transmitting the next resource to the subscriber.

8. The system of claim 7, wherein the next HTTP GET request remains on the feed server until the next resource is created.

9. The system of claim 7, wherein the feed server generates the next resource from content produced by the resource provider, and wherein the feed server subsequently publishes the resource located at the next URI through a use of Atom Publishing Protocol (APP).

10. The system of claim 7, wherein the next resource is a news webpage in a feed of news webpages.

11. The system of claim 7, wherein the next resource is a servlet.

12. The system of claim 7, wherein the next resource is a server-side service.

13. A computer program product for retrieving resources from a resource provider, the computer program product comprising:
a computer readable storage memory having computer usable program code embodied therewith, the computer usable program code comprising:
computer usable program code configured to receive, at a feed server, an initial HTTP GET request from a subscriber, wherein the initial HTTP GET request requests an initial resource from a feed, and wherein the initial resource is located at an initial Uniform Resource Identifier (URI);
computer usable program code configured to retrieve, by the feed server, the initial resource requested by the initial HTTP GET request;
computer usable program code configured to transmit, from the feed server to the subscriber, the initial resource and a next URI for a next resource in the feed, wherein the next URI is generated by the feed server for the next resource in the feed, and wherein the next URI is generated before the next resource in the feed is created;
computer usable program code configured to receive, at the feed server, a next HTTP GET request from the subscriber, wherein the next HTTP GET request requests the next resource using the next URI that was transmitted from the feed server to the subscriber; computer usable program code configured to, in response to the next resource being created, assign the next URI to the next resource, wherein the next URI is assigned to the next resource by the feed server; computer usable program code configured to retrieve, by the feed server, the next resource using the next URI; and computer usable program code configured to transmit the next resource to the subscriber.

14. The computer program product of claim 13, wherein the next HTTP GET request remains on the feed server until the next resource is created.

15. The computer program product of claim 13, wherein the feed server generates the next resource from content produced by the resource provider, and wherein the feed server subsequently publishes the resource located at the next URI through a use of Atom Publishing Protocol (APP).

16. The computer program product of claim 13, wherein the next resource is a news webpage in a feed of news webpages.

17. The computer program product of claim 13, wherein the next resource is a servlet.

18. The computer program product of claim 13, wherein the next resource is a server-side service.

19. The computer program product of claim 13, wherein the computer usable medium is a component of a remote server, and wherein the computer usable program code is deployable to a local computer from the remote server.

20. The computer program product of claim 13, wherein the computer usable program code is capable of being provided by a service provider to a customer on an on-demand basis.

* * * * *